United States Patent [19]

Mayo et al.

[11] Patent Number: 5,164,493
[45] Date of Patent: Nov. 17, 1992

[54] PROCESSES FOR THE PREPARATION OF TITANYL PHTHALOCYANINES TYPE I WITH PHTHALONITRILE

[75] Inventors: James D. Mayo, Toronto; James M. Duff, Mississauga, both of Canada

[73] Assignee: Xerox Corporation, Stamford, Conn.

[21] Appl. No.: 661,978

[22] Filed: Feb. 28, 1991

[51] Int. Cl.$^5$ ............... C09B 47/067; C09B 47/073; C09B 67/50

[52] U.S. Cl. .................... 540/143; 540/141

[58] Field of Search .............. 540/141, 142, 143

[56] References Cited

U.S. PATENT DOCUMENTS

| | | | |
|---|---|---|---|
| 3,927,026 | 12/1975 | Brach et al. | 260/314.5 |
| 4,443,528 | 4/1984 | Tumura et al. | 430/56 |
| 4,643,770 | 2/1987 | Hays | 106/23 |
| 4,664,997 | 5/1987 | Suzuki et al. | 430/58 |
| 4,725,519 | 2/1988 | Suzuki et al. | 430/58 |
| 4,728,592 | 3/1988 | Ohaka et al. | 430/59 |
| 4,771,133 | 9/1988 | Liebermann et al. | 540/143 |
| 4,777,251 | 10/1988 | Tanaka et al. | 540/143 |
| 4,898,799 | 2/1990 | Fujimaki et al. | 430/59 |

FOREIGN PATENT DOCUMENTS 0314100  5/1989  European Pat. Off. .

OTHER PUBLICATIONS

"The phthalolyanines" vol. II by Moser and Thomas CRC Press Inc., pp. 1-3 1983 edition.

*Primary Examiner*—Mukund J. Shah
*Assistant Examiner*—Jyothsna Venkat

[57] ABSTRACT

A process for the preparation of titanyl phthalocyanine which comprises the reaction in a solvent of phthalonitrile and diiminoisoindoline with titanium tetraalkoxide.

33 Claims, No Drawings

PROCESSES FOR THE PREPARATION OF TITANYL PHTHALOCYANINES TYPE I WITH PHTHALONITRILE

BACKGROUND OF THE INVENTION

This invention is generally directed to titanyl phthalocyanines and processes for the preparation thereof, and more specifically the present invention is directed to processes for obtaining titanyl phthalocyanine polymorphs or crystal forms, known as Type I, reference for example U.S. Pat. No. 4,898,799, the disclosure of which is totally incorporated herein by reference, and wherein there can be obtained from the formed Type I, Type IV or similar titanium phthalocyanines which can be selected as a photogenerating pigment for layered photoconductive imaging members. In one embodiment, the present invention is directed to a process for the preparation of Type I titanyl phthalocyanines by the reaction of phthalonitrile and diiminoisindoline with a titanium tetraalkoxide, such as titanium tetraperoxide. The known titanyl phthalocyanines, especially the known polymorph IV and the X form which can be obtained from the aforementioned Type I, can be selected as organic photogenerator pigments in photoresponsive imaging members containing charge, especially hole transport layers such as aryl amine hole transport molecules. The aforementioned photoresponsive imaging members can be negatively charged when the photogenerating layer is situated between the hole transport layer and the substrate, or positively charged when the hole transport layer is situated between the photogenerating layer and the supporting substrate. The layered photoconductor imaging members can be selected for a number of different known imaging and printing processes including, for example, electrophotographic imaging processes, especially xerographic imaging and printing processes wherein negatively charged or positively charged images are rendered visible with toner compositions of the appropriate charge. Generally, the imaging members are sensitive in the wavelength regions of from about 700 to about 850 nanometers, thus diode lasers can be selected as the light source. Titanyl phthalocyanines may also be selected as intense blue light-stable colorants for use in coatings, such as paint, inks, and as near infrared absorbing pigments suitable for use as IR laser optical recording materials.

The process of the present invention in one embodiment involves dissolving the Type I titanyl phthalocyanine (TiOPc) pigment obtained in a suitable solvent such as sulfuric acid, trifluoroacetic acid, and the like, or mixtures of trifluoroacetic acid and methylene chloride, followed by a reprecipitation of the dissolved pigment into a second solvent system comprised, for example, of an alcohol such as methanol, water, toluene, tetrahydrofuran, dimethyl formamide, mixtures thereof, and the like. The composition of both the solvent and the precipitant solvent primarily determines which polymorphic form of TiOPc can be obtained. The desired polymorphic form, which can be controlled by the selection of precipitant solvent to provide any one of Type II, III, IV, X or others can be isolated by a simple filtration process whereby the precipitated mixture is poured directly into a porcelain funnel fitted with a glass fiber filter cloth, and can be washed with water and/or organic solvents such as acetone or methanol to attain a suitable degree of purity. More specifically, with tetrahydrofuran, 1 part by weight, and methylene chloride, 4 parts, and the nonsolvent water, 5 parts, Type IV titanyl phthalocyanine can be obtained. Similarly, Type X, III, and II titanyl phthalocyanines can be obtained from Type I by selecting in place of the water methanol-water, 1:1; acetone-water, 1:1; o isopropanol, respectively.

Certain titanium phthalocyanine pigments have been known since at least the publication WW 2(PB 85172 Fiat Final Report 1313, Feb. 1, 1948). However, unlike other phthalocyanines such as metal-free, copper, iron and zinc phthalocyanines, titanium phthalocyanines have, it is believed had minimum commercial use. Titanyl phthalocyanines or oxytitanium phthalocyanines are known to absorb near-infrared light around 800 nonometers and a number of such pigments have been illustrated in the prior art as materials for IR laser optical recording material, reference for example BASF German 3,643,770 and U.S. Pat. No. 4,458,004. Also, the use of certain titanium phthalocyanine pigments as a photoconductive material for electrophotographic applications is known, reference for example British Patent Publication 1,152,655, the disclosure of which is totally incorporated herein by reference. Also, U.S. Pat. No. 3,825,422 illustrates the use of titanyl phthalocyanine as a photoconductive pigment in an imaging process known as particle electrophoresis. Additionally, the utilization of certain titanyl phthalocyanines and substituted derivatives thereof in a dual layer electrographic device is illustrated in EPO 180931, May 14, 1986. Moreover, the use of tetra- and hexadeca-fluorosubstituted titanyl phthalocyanine in an electrophotographic device is illustrated in U.S. Pat. No. 4,701,396. In Japanese Patent Publication 64-171771, August, 1986, there is illustrated the use of titanyl phthalocyanine, which has been treated with a hot solvent, in electrophotography. Further, in German 3,821,628 there is illustrated the utilization of certain titanyl phthalocyanines, and other pigments in electrophotography, and wherein the titanyl phthalocyanines have been purified primarily to reduce the level of ash, volatile contaminants and sodium to below specified levels.

As mentioned in the textbook *Phthalocyanine Compounds* by Moser and Thomas, the disclosure of which is totally incorporated herein by reference, polymorphism or the ability to form distinct solid state forms is well known in phthalocyanines. For example, metal-free phthalocyanine is known to exist in at least 5 forms designated as alpha, beta, pi, X and tau. Copper phthalocyanine crystal forms known as alpha, beta, gamma, delta, epsilon and pi are also described. These different polymorphic forms are usually distinguishable on the basis of differences in the solid state properties of the materials which can be determined by measurements, such as Differential Scanning Calorimetry, Infrared Spectroscopy, Ultraviolet-Visible-Near Infrared Spectroscopy and, especially, X-Ray Powder Diffraction techniques. There appears to be general agreement on the nomenclature used to designate specific polymorphs of commonly used pigments such as metal-free and copper phthalocyanine. However, this does not appear to be the situation with titanyl phthalocyanines as different nomenclature is selected in a number of instances. For example, reference is made to alpha, beta, A, B, C, y, and m forms of TiOPc (titanyl phthalocyanine) with different names being used for the same form in some situations. It is believed that four main crystal forms of TiOPc are known, that is Types I, II, III, and IV, reference copending application U.S. Ser. No. 533,261 (D/90198), the disclosure of which is totally incorporated herein by reference.

Titanyl phthalocyanine can be classified as indicated in Table 1 that follows:

TABLE 1

| Crystal Form | Other Names | Documents |
|---|---|---|
| Type I | β | Toyo Ink Electrophotog. (Japan) 27,533 (1988) |
| | β | Dainippon U.S. Pat. No. 4,728,592 |
| | β | Sanyo-Shikiso JOP 63-20365 |
| | A | Mitsubishi JOP 62-25685, -6, -7 Conference Proceedings |
| | A | Konica "Japan Hardcopy 1989", 103, (1989) |
| Type II | α | Toyo Ink "Electrophoto (Japan)" 27,533 (1988) |
| | α | Sanyo-Shikiso JOP 63-20365 |
| | α | Konica U.S. Pat. No. 4,898,799 |
| | α | Dainippon U.S. Pat. No. 4,728,592 |
| | α | Mita EU 314,100 |
| | B | Mitsubishi JOP 62-25685, -6, -7 |
| | B | Konica "Japan Hardcopy 1989, 103, (1989) |
| Type III | C | Mitsubishi OP 62-25685, -6, -7 |
| | C | Konica "Japan Hardcopy 1989, 103, (1989) |
| | m | Toyo Ink "Electrophoto (Japan)" 27,533 (1988) |
| Type IV | y | Konica "Japan Hardcopy 1989", 103, (1989) |
| | Unnamed | Konica U.S. Pat. No. 4,898,799 |
| | New Type | Sanyo-Shikiso JOP 62-20365 |

More specifically, the aforementioned documents illustrate, for example, the use of specific polymorphs of TiOPc in electrophotographic devices. Three crystal forms of titanyl phthalocyanine, differentiated by their XRPDs, were specifically illustrated, identified as A, B, and C, which it is believed are equivalent to Types I, II, and III, respectively. In Japanese 62-256865 there is disclosed, for example, a process for the preparation of pure Type I involving the addition of titanium tetrachloride to a solution of phthalonitrile in an organic solvent which has been heated in advance to a temperature of from 160° to 300° C. In Japanese 62-256866, there is illustrated, for example, a method of preparing the aforementioned polymorph which involves the rapid heating of a mixture of phthalonitrile and titanium tetrachloride in an organic solvent at a temperature of from 100° to 170° C. over a time period which does not exceed one hour. In Japanese 62-256867, there is described, for example, a process for the preparation of pure Type II (B) titanyl phthalocyanine, which involves a similar method to the latter except that the time to heat the mixture at from 100° to 170° C. is maintained for at least two and one half hours. Types I and II, in the pure form obtained by the process of the above publications, apparently afforded layered photoresponsive imaging members with excellent electrophotographic characteristics.

In Mita EPO Patent Publication 314,100, there is illustrated the synthesis of TiOPc by, for example, the reaction of titanium alkoxides and diiminoisoindoline in quinoline or an alkylbenzene, and the subsequent conversion thereof to an alpha Type pigment (Type II) by an acid pasting process, whereby the synthesized pigment is dissolved in concentrated sulfuric acid, and the resultant solution is poured onto ice to precipitate the alpha-form, which is filtered and washed with methylene chloride. This pigment, which was blended with varying amounts of metal free phthalocyanine, could be selected as the electric charge generating layer in layered photoresponsive imaging members with a high photosensitivity at, for example, 780 nanometers.

In Sanyo-Shikiso Japanese 63-20365/86, reference is made to the known crystal forms alpha and beta TiOPc (Types II and I, respectively, it is believed), which publication also describes a process for the preparation of a new form of titanyl phthalocyanine, which is apparently not named. This publication appears to suggest the use of the unnamed titanyl phthalocyanine as a pigment and its use as a recording medium for optical discs. This apparently new for was prepared by treating acid pasted TiOPc (Type II form, it is believed) with a mixture of chlorobenzene and water at about 50° C. The resulting apparently new form is distinguished on the basis of its XRPD, which appears to be identical to that shown in FIG. 1 for the Type IV polymorph.

In U.S. Pat. No. 4,728,592, there is illustrated, for example, the use of alpha type TiOPc (Type II) in an electrophotographic device having sensitivity over a broad wavelength range of from 500 to 900 nanometers. This form was prepared by the treatment of dichlorotitanium phthalocyanine with concentrated aqueous ammonia and pyridine at reflux for 1 hour. Also described in the aforementioned patent is a beta Type TiOPc (Type I) as a pigment, which is believed to provide a much poorer quality photoreceptor.

In Konica Japanese 64-17066/89, there is disclosed, for example, the use of a new crystal modification of TiOPc prepared from alpha type pigment (Type II) by milling it in a sand mill with salt and polyethylene glycol. This pigment had a strong XRPD peak at a value of 2 theta of 27.3 degrees. This publication also discloses that this new form differs from alpha type pigment (Type II) in its light absorption and shows a maximum absorbance at 817 nanometers compared to alpha-type, which has a maximum at 830 nanometer. The XRPD shown in the publication for this new form is believed to be identical to that of the Type IV form previously described by Sanyo-Shikiso in JOP 63-20365. The aforementioned Konica publication also discloses the use of this new form of TiOPc in a layered electrophotographic device having high sensitivity to near infrared light of 780 nanometers. The new form is indicated to be superior in this application to alpha type TiOPc (Type II). Further, this new form is also described in U.S. Pat. No. 4,898,799 and in a paper presented at the Annual Conference of Japan Hardcopy in July 1989. In this paper, this same new form is referred to as Type y, and reference is also made to Types I, II, and III as A, B, and C, respectively.

In the journal, *Electrophotography* (Japan) vol. 27, pages 533 to 538, Toyo Ink Manufacturing Company, there is disclosed, for example, alpha and beta forms of TiOPc (Types I and II, it is believed) and also this journal discloses the preparation of a Type m TiOPc, an apparently new form having an XRPD pattern which was distinct from other crystal forms. It is believed that this XRPD is similar to that for the Type III titanyl phthalocyanine pigment but it is broadened most likely as the particle size is much smaller than that usually found in the Type III pigment. This pigment was used to prepare photoreceptor devices having greater sensitivity at 830 nanometers than alpha or beta Type TiOPc (Type II or I, respectively).

Processes for the preparation of specific polymorphs of titanyl phthalocyanine, which require the use of a strong acid such as sulfuric acid, are known, and these processes, it is believed, are not easily scable. One process as illustrated in Konica Japanese Laid Open on Jan. 20, 1989 as 64-17066 (U.S. Pat. No. 4,643,770 appears to be its equivalent), the disclosure of which is totally incorporated herein by reference, involves, for example, the reaction of titanium tetrachloride and phthalodinitrile in 1-chloronaphthalene solvent to produce dichlorotitanium phthalocyanine which is then subjected to hydrolysis by ammonia water to enable the Type II polymorph. This phthalocyanine is preferably treated with an electron releasing solvent such as 2-ethoxyethanol, dioxane, N-methylpyrrolidone, followed by subjecting the alpha-titanyl phthalocyanine to milling at a temperature of from 50° to 180° C. In a second method described in the aforementioned Japanese Publication, there is disclosed the preparation of alpha type titanyl phthalocyanine with sulfuric acid. Another method for the preparation of Type IV titanyl phthalocyanine involves the addition of an aromatic hydrocarbon, such as chlorobenzene solvent to an aqueous suspension of Type II titanyl phthalocyanine prepared by the well known acid pasting process, and heating the resultant suspension to about 50° C. as disclosed in Sanyo-Shikiso Japanese 63-20365, Laid Open Jan. 28, 1988. In Japanese 171771/1986, Laid Open Aug. 2, 1986, there is disclosed the purification of metallophthalocyanine by treatment with N-methylpyrrolidone.

To obtain a TiOPc-based photoreceptor having high sensitivity to near infrared light, it is believed necessary to control not only the purity and chemical structure of the pigment, as is generally the situation with organic photoconductors, but also to prepare the pigment in the correct crystal modification. The disclosed processes used to prepare specific crystal forms of TiOPc, such as Types I II, III and IV, are either complicated and difficult to control as in the preparation of pure Types I and II pigment by careful control of the synthesis parameters by the processes described in Mitsubishi Japanese 62-25685, -6 and -7, or involve harsh treatment such as sand milling at high temperature, reference Konica U.S. Pat. No. 4,898,799; or discussion of the pigment in a large volume of concentrated sulfuric acid, a solvent which is known to cause decomposition of metal phthalocyanines, reference Sanyo-Shikiso Japanese 63-20365 and Mita EPO 314,100.

In a patentability search report the following U.S. patents were listed: U.S. Pat. No. 3,927,026, which discloses a process for the preparation of X-form metal phthalocyanine by mixing phthalonitrile in an alkylalkanolamine, adding ammonia, seeding the mixture with a catalytic amount of X-form phthalocyanine, adding a metal salt, and refluxing, see the Abstract of the Disclosure for example; U.S. Pat. No. 4,771,133 which discloses, for example, a process for the preparation of vanadyl phthalocyanine for electrophotographic devices by reacting vanadium pentoxide and phthalonitrile, see the Abstract of the Disclosure, and as background interest U.S. Pat. Nos. 4,443,528; 4,664,997; 4,725,519; 4,728,592; 4,777,251 and 4,898,799.

The present invention in embodiments thereof are directed to economical methods for the preparation of Type I titanyl phthalocyanine in acceptable yield and of high purity and the subsequent conversion of this material into other known titanyl phthalocyanine polymorphic forms, which methods can be considered an improvement over the prior art in that, for example, they are not complex in that no sophisticated equipment, such as a glass-lined reactor is required for the addition of dangerous or volatile materials such as titanium tetrachloride or concentrated sulfuric acid, are rapid in that reaction times are on the order of two hours as compared to six to eight hours illustrated in a number of the prior art teachings, and do not require the use of harsh reagents such as sulfuric acid or the use of energy intensive processes such as sand milling. Other advantages of the present invention are as illustrated herein.

Layered photoresponsive imaging members are described in a number of U.S. patents, such as U.S. Pat. No. 4,265,900, the disclosure of which is totally incorporated herein by reference, wherein there is illustrating an imaging member comprised of a photogenerating layer, and an aryl amine hole transport layer. Examples of photogenerating layer components include trigonal selenium, metal phthalocyanines, vanadyl phthalocyanines, and metal free phthalocyanines. Additionally, there is described in U.S. Pat. No. 3,121,006 a composite xerographic photoconductive member comprised of finely divided particles of a photoconductive inorganic compound dispersed in an electrically insulating organic resin binder. The binder materials disclosed in the '006 patent comprise a material which is incapable of transporting for any significant distance injected charge carriers generated by the photoconductive particles. Moreover, there is disclosed in U.S. Pat. No. 3,824,099 certain photosensitive hydroxy squaraine compositions.

In copending application U.S. Ser. No. 537,714 filed Jun. 14, 1990 (D/90087), the disclosure of which is totally incorporated herein by reference, there are illustrated photoresponsive imaging members with photogenerating titanyl phthalocyanine layers prepared by vacuum deposition. It is indicated in this copending application that the imaging members comprised of the vacuum deposited titanyl phthalocyanines and aryl amine hole transporting compounds exhibit superior xerographic performance as low dark decay characteristics results and higher photosensitivity is generated, particularly in comparison to several prior art imaging members prepared by solution coating or spray coating, reference for example U.S. Pat. No. 4,429,029 mentioned hereinbefore.

In copending application U.S. Ser. No. 533,265, filed Jun. 4, 1990, the disclosure of which is totally incorporated herein by reference, there is illustrated a process for the preparation of phthalocyanine composites which comprises adding a metal free phthalocyanine, a metal phthalocyanine, a metalloxy phthalocyanine or mixtures thereof to a solution of trifluoroacetic acid and a monohaloalkane; adding to the resulting mixture a titanyl phthalocyanine; adding the resulting solution to a mixture that will enable precipitation of said composite; and recovering the phthalocyanine composite precipitated product.

Also in copending application U.S. Ser. No. 533,261, filed Jun. 4, 1990, the disclosure of which is totally incorporated herein by reference, there are illustrated various types of phthalocyanines and processes for the preparation thereof. One embodiment of the aforementioned copending application is directed to processes for the preparation of titanyl phthalocyanines, which comprise the addition of 1,3-diiminoisoindoline, which is considered a costly reactant, to N-methylpyrrolidone and titanium tetrapropoxide, see Example I, to provide Type I or β-type titanyl phthalocyanine as determined by X-ray powder diffraction; dissolving the resulting titanyl phthalocyanine in a mixture of trifluoroacetic acid and methylene chloride; adding the resulting mixture to a stirred organic solvent, such as methanol, or to water; separating the resulting precipitate by, for example, vacuum filtration through a glass fiber paper in a Buchner funnel; and washing the titanyl phthalocyanine product.

Diiminoisoindoline, especially the 1,3 form (DI³), is not readily commercially available, but can be obtained at a cost of about $1,000 per kilogram, and with the present invention in embodiments less, as much as 90 percent, for example, diiminoisoindoline may be selected, or with the ammonium process illustrated herein the use of diiminoisoindoline can be avoided. The phthalonitrile reactant utilized is substantially less costly, for example about $20 per kilogram. Generally, to obtain acceptable yields, for example, from about 50 to about 95 percent, of titanyl phthalocyanine using phthalonitrile, it is necessary to react it with titanium tetrachloride. This reagent is strongly corrosive and reactive in the air, emitting toxic fumes. A consequence of its corrosive nature is that it usually is not used in conventional metal reactors which are desirable for large scale preparations. Another serious drawback to the use of TiCl₄ to synthesize Type I TiOPc is that it can result in the formation of chlorinated phthalocyanine byproduct which cannot be readily removed from the product (reference, for example, the hereinbefore mentioned publication by Konic: Japan Hardcopy, 1989, page 103). This latter problem renders the Type I titanyl phthalocyanine obtained undesirable for use in layered photoconductive devices in which highly pure grades of pigment are required. The process of the present invention avoids, or minimizes the aforementioned problems. Further, the titanium tetraalkoxides, such as titanium-tetrapropoxide and titanium-tetrabutoxide, selected as reactants for the process of the present invention are relatively noncorrosive and remain stable with oxidation or hydrolysis when exposed to room temperature air for the length of time required to add them to the solution, from about ½ minute to about 15 minutes and typically about 1 minute. The yield of Type I TiOPc obtained when the aforementioned reagents are reacted with phthalonitrile under a variety of conditions is usually unacceptably low, being about 15 percent. With the processes of the present invention, in embodiments the use of small amounts of the reactant 1,3-diiminoisoindoline can result in higher yields of, for example, from about 60 to about 80 percent. Also, a number of the prior art teachings disclose the use of diiminoisoindoline and titanium tetrapropoxide or the use of phthalonitrile with titanium tetrachloride in high boiling and malodorous solvents such as chloronaphthalene and quinoline, as the preferred method in the synthesis photoreceptor-grade TiOPc. The process of the present invention in embodiments permits a greater number of solvents to be used, including the non-odorous N-methyl pyrrolidone.

The disclosures of all of the aforementioned publications, laid open applications, pending applications, and patents are totally incorporated herein by reference.

SUMMARY OF THE INVENTION

It is a feature of the present invention to provide processes for the preparation of titanyl phthalocyanines with many of the advantages illustrated herein.

It is yet another feature of the present invention to provide economically scalable processes for the preparation of titanyl phthalocyanines.

Another feature of the present invention relates to the preparation of the Type I titanyl phthalocyanine polymorph.

Another feature of the present invention relates to the preparation of Type I titanyl phthalocyanine using noncorrosive, low toxicity reagents.

Another feature of the present invention relates to the preparation of Type I titanyl phthalocyanine with the solvents quinoline, chloronaphthalene or N-methylpyrrolidone.

Moreover, another feature of the present invention relates to the preparation of titanyl phthalocyanines which have carbon, hydrogen, and nitrogen analyses within 0.5 percent of the theoretical values for titanyl phthalocyanine of C, 66.67 percent; H, 2.80 percent; N, 19.44 percent, and have a volatile impurity content of no more than 0.5 percent, as measured by thermogravimetric analysis.

Additionally, another feature of the present invention relates to the preparation of titanyl phthalocyanine Type I polymorph intermediates in acceptable yields of, for example, exceeding about 75 percent in embodiments of the present invention.

Another feature of the present invention resides in processes wherein there are selected reactants which do not cause the formation of chlorinated phthalocyanine byproducts.

Yet another feature of the present invention resides in the generation of at least 99.5 percent pure TiOPc with about less than 0.5 percent of volatile components, as measured by thermogravimetric analysis; acceptable product yields of from about 50 to about 95 percent while reducing the amount of the highly expensive reagent diiminoisoindoline by as much as 90 percent, or in an embodiment eliminating its use entirely.

A further feature of the process of the present invention is that it affords in embodiments Type I TiOPc in a crystal shape and size which allows for easy, rapid filtration and subsequent washing of the final product in an efficacious manner and wherein the specific concentration of reagents, that is for example wherein the reagents are added to the solvent in an amount from about 17 to about 23 and preferably about 20 percent of the total weight of the reagents used.

A further specific feature of the present invention resides in the provision of photoresponsive imaging members with an aryl amine hole transport layer, and a photogenerator layer comprised of titanyl phthalocyanine pigment IV obtained from the titanyl phthalocyanine Type I intermediate obtained with the processes of the present invention.

These and other features of the present invention can be accomplished in embodiments thereof by processes for the preparation of titanyl phthalocyanines and photoresponsive imaging members thereof. More specifically, in one embodiment of the present invention there are provided processes for the preparation of titanyl phthalocyanine (TiOPc) Type I polymorphs which comprise the reaction of a phthalonitrile, such as orthophthalonitrile, a diiminoisoindoline, such as 1,3-diiminoisoindoline (DI³) with titanium tetraalkoxide, and wherein the amount of DI³ consumed can be reduced by replacement with phthalonitrile by as much as 90 percent. In one embodiment, when a ratio of 3 parts o-phthalonitrile to 1 part diiminoisoindoline is used, there can be effected a 75 percent reduction in the use of said diiminoisoindoline at a cost savings of about $1,000 per kilogram of product Type I titanyl phthalocyanine product. In another embodiment of the present invention, it is possible to completely eliminate the use of diiminoisoindoline by a process which comprises the bubbling of anhydrous ammonia gas, from about 0.1 part to about 2 parts of the phthalonitrile that is present, into a mixture of phthalonitrile in a solvent prior to and during the heating thereof of the mixture followed by the addition of a titanium tetraalkoxide followed by heating to reflux for a period of not less than 2 hours to ultimately afford the Type I TiOPc. In this particular embodiment a cost savings of $1,300 per kilogram of product TiOPc can be realized. In another embodiment, the present invention is directed to a process for the preparation of titanyl phthalocyanine Type I wherein anhydrous ammonia gas is introduced into a solution comprised of phthalonitrile and an organic solvent, followed by the addition of a titanium tetraalkoxide, and wherein there is formed in situ diiminoisoindoline precursor.

The TiOPc product can be identified by various known means including X-ray powder diffraction (XRPD) and elemental analysis as described, for example, in the prior art reference: U.S. Pat. No. 4,728,592 (Type I), JOP 63-20365 and U.S. Pat. No. 4,898,799 (Type IV), the disclosures of which are totally incorporated herein by reference.

In one embodiment, the present invention is directed to a process for the preparation of titanyl phthalocyanine Type I which comprises the reaction in a solvent of phthalonitrile, diiminoisolindoline, and titanium tetraalkoxide.

In another embodiment, the process of the present invention comprises 1) the addition of 1 part titanium tetrapropoxide to a stirred solution of from about 10 parts phthalonitrile, especially ortho-phthalonitrile, and about 1 part diiminoisoindoline, especially $DI^3$, to about 1 part phthalonitrile and about 1 part diiminoisoindoline and preferably about 3 parts phthalonitrile and 1 part diiminoisoindoline such that the combined amount of phthalonitrile and diiminoisoindoline is in a ratio of from about 10 to 1 to about 1 to 1 and preferably about 4 to 1 to the amount of tetrapropoxide used, in about 15 parts to about 50 parts and preferably about 31 parts on a mole basis of a solvent, such as N-methyl pyrrolidone solvent; 2) relatively slow application of heat at a rate of about 1° C. per minute to about 10° per minute and preferably at about 5° per minute until refluxing occurs at a temperature of about 130° to about 180° C.; 3) removal and collection of the resulting distillate, which was shown by NMR spectroscopy to be the alcohol of the corresponding propoxide being used, in a dropwise fashion using an appropriate apparatus, such as a Claisen Head Condenser, until the temperature of the reactants reaches from 190° C. to about 200° C. and preferably about 200° C.; 4) continued stirring at the said reflux temperature for a period of about 1 hour to about 8 hours and preferably about 2 hours; 5) cooling by removal of the heat source of the reactants to a temperature of about 130° C. to about 180° C. and preferably about 160° C.; 6) filtration of the flask contents through, for example, an M-porosity (10 to 15 μm) sintered glass funnel which was preheated using a solvent which is capable of raising the temperature of the funnel to about 150° C., such as boiling dimethylformamide in an amount sufficient to completely cover the bottom of the funnel to prevent blockage of the filter; 7) washing the resulting purple solid by slurrying said solid in portions of boiling DMF either in the funnel or in a separate vessel in a ratio of about 1 to about 10, and preferably about 3 times the volume of the solid being washed, until the filtrate became light blue in color; 8) cooling the solid by slurrying said solid in one portion of DMF at room temperature, about 25° C., either in the funnel or in a separate vessel, approximately equivalent to three times the volume of the solid present; 9) washing the solid with one portion, approximately equivalent to three times the volume of the solid present, of another solvent, such as an alcohol, like methanol, acetone, water and the like; and 10) oven drying in the presence of a vacuum or in air at a temperature of from 25° C. to about 200° C. and preferably about 70° C. for a period of from about 2 hours to about 48 hours and preferably about 24 hours thereby resulting in a shiny purple solid which was identified as being Type I titanyl phthalocyanine by its X-ray powder diffraction trace.

In another embodiment of the present invention, there is provided a process for the preparation of titanyl phthalocyanine polymorphs, which comprises the: 1) addition of from about 1 part to about 10 parts and preferably 4 parts of o-phthalonitrile to from about 10 parts to about 50 parts and in an embodiment 15 parts of N-methyl pyrrolidone solvent; 2) addition of from 1 part to about 10 parts, and in an embodiment, 8 parts of anhydrous ammonia gas directly into the solution by means of a gas bubbling tube which is regulated to flow at a rate of about 0.005 gram per minute to about 0.05 gram per minute and in an embodiment about 0.015 gram per minute; 3) addition of 1 part of titanium tetraalkoxide in one portion; 4) application of heat at the rate indicated herein, see for example step 2) above, until refluxing was observed at a temperature of about 120° C. to about 200° C.; 5) continued heating and addition of anhydrous ammonia gas for a period of from about 30 minutes to about 8 hours, and preferably about 2 hours; 6) cooling, filtering and washing as illustrated hereinbefore to afford a shiny purple solid which was identified as being Type I titanyl phthalocyanine by its X-ray powder diffraction trace.

In an embodiment of the present invention, there is provided a process for the conversion of the titanyl phthalocyanine obtained, such as Type I, to other titanyl phthalocyanine polymorphs which comprises: 1) dissolving the precursor pigment, which can be any suitable crystal form of TiOPc, in a mixture of trifluoroacetic acid and methylene chloride comprised of from 5 parts acid to about 25 parts acid and 95 parts to 75 parts of methylene chloride and in an embodiment 20 parts acid and 80 parts methylene chloride, wherein the amount of precursor pigment is, for example, from 5 parts to about 25 parts of the precursor pigment to 100 parts of acid solution and in this embodiment 10 parts pigment to 100 parts acid solution, by adding the pigment to the solution and stirring the mixture for an effective period of time, for example from about 5 minutes to about two weeks and in this embodiment 10 minutes, at a temperature of from about 0° to about 50° C. and in this embodiment about 25° C.; 2) pouring or adding the resultant solution into a rapidly stirred precipitant solvent in a ratio of from about 1 part of the aforementioned pigment solution to 2 parts of precipitant solution to about 1 part pigment solution to about 50 parts of precipitant, and in this embodiment about 1 part pigment solution to about 10 parts precipitant solvent mixture, at a temperature of from about 0° to about 100° C. over a period of from 1 second to about 60 minutes, and in this embodiment about 25° C. over a period of about 30 seconds to ensure rapid effluent mixing. In an embodiment, the precipitant solution was stirred at a rate sufficient to form a deep vortex in the reaction vessel, and the pigment was poured in a slow stream into the side of the vortex; 3) following the addition, the resultant dispersion of the desired polymorphic form of TiOPc was stirred at a temperature of from 0° to about 100° C. for a period of from about 5 minutes to about 24 hours and in this embodiment about 1 hour at a temperature of 25° C.; 4) subsequently separating the titanyl phthalocyanine from the mother liquor by filtration, for example through a glass fiber filter in a porcelain filter funnel, and washing the product titanyl phthalocyanine pigment in the funnel with an effective amount of solvent, for example from about 20 parts of wash solvent to about 1 part of the starting pigment and in this embodiment about 3 parts, such as methanol, to remove most of the acidic mother liquor; 5) redispersion the resulting wet cake in a solvent, such as methanol, acetone, water, and the like in an effective amount of, for example, from about 1 part to about 100 parts of solvent to 1 part of the pigment for a period of from about 5 minutes to 24 hours at a temperature of from 0°° C. to about 100° C. and in this embodiment about 50 parts of solvent to 1 part pigment at a temperature of about 25° C. for a period of about 1 hour, the primary purpose of such washing being to further remove any residual acid or other impurities from the particular polymorphic form of TiOPc which resulted from the precipitation process; and 6) isolating the desired titanyl phthalocyanine polymorph by, for example, filtration through a glass fiber filter as in step 4), and subsequently optionally washing the solid product in the funnel with a solvent, such as water, methanol or acetone, and the like to complete purification. The final product can be obtained after the solid has been dried at a temperature of from about 25° to about 150° C. for a time of 1 hour to about 24 hours, for example either in the air or under vacuum. A yield corresponding to about 98 percent to about 75 percent of the weight of the starting pigment can be obtained. The titanyl phthalocyanine Type I material has a purity of at least 99.5 percent as measured by thermogravimetric and elemental analysis, and can possess a particle size or average diameter of about 50 microns as determined by SEM and a caliper with the crystal shape being comprised of tightly clustered aggregates of smaller crystallites.

In another embodiment, the present invention is directed to a process for the preparation of titanyl phthalocyanine Type I which comprises the addition of a titanium tetraalkoxide, for example an alkoxide with from 1 carbon atom to about 6 carbon atoms, to o-phthalonitrile, in N-methyl pyrrolidone solvent and wherein anhydrous ammonia gas is introduced into the solution to form 1,3-diiminoisoindoline in situ, which $DI^3$ reacts with the alkoxide to form Type I as a precipitate, followed by filtration, and washings as illustrated herein with reference to the reaction of $DI^3$, phthalonitrile, and titanium tetraalkoxide.

Numerous different layered photoresponsive imaging members with the phthalocyanine pigments obtained from the Type I with the processes of the present invention can be fabricated. In one embodiment, thus the layered photoresponsive imaging members are comprised of a supporting substrate, a charge transport layer, especially an aryl amine hole transport layer, and situated therebetween a photogenerator layer comprised of titanyl phthalocyanine of Type X, Type Z-1, Type Z-2 or Type IV. Another embodiment of the present invention is directed to positively charged layered photoresponsive imaging members comprised of a supporting substrate, a charge transport layer, especially an aryl amine hole transport layer, and as a top overcoating titanyl phthalocyanine pigments Type X or Type IV obtained with the processes of the present invention. Moreover, there is provided in accordance with the present invention an improved negatively charged photoresponsive imaging member comprised of a supporting substrate, a thin adhesive layer, a titanyl phthalocyanine obtained by the processes of the present invention photogenerator dispersed in a polymeric resinous binder, and as a top layer aryl amine hole transporting molecules dispersed in a polymeric resinous binder.

The photoresponsive imaging members can be prepared by a number of known methods, the process parameters and the order of coating of the layers being dependent on the member desired. The imaging members suitable for positive charging can be prepared by reversing the order of deposition of photogenerator and hole transport layers. The photogenerating and charge transport layers of the imaging members can be coated as solutions or dispersions onto selective substrates by the use of a spray coater, dip coater, extrusion coater, roller coater, wire-bar coater, slot coater, doctor blade coater, gravure coater, and the like, and dried at from 40° to about 200° C. for form 10 minutes to several hours under stationary conditions or in an air flow. The coating is carried out in such a manner that the final coating thickness is from 0.01 to about 30 microns after it has dried. The fabrication conditions for a given layer will be tailored to achieve optimum performance and cost in the final device.

Imaging members with the titanyl phthalocyanine pigments Type IV, for example, are useful in various electrostatographic imaging and printing systems, particularly those conventionally known as xerographic processes. Specifically, the imaging members of the present invention are useful in xerographic imaging processes wherein the titanyl phthalocyanine pigments absorb light of a wavelength of from about 600 nanometers to about 900 nanometers. In these known processes, electrostatic latent images are initially formed on the imaging member followed by development, and thereafter transferring the image to a suitable substrate.

Moreover, the imaging members can be selected for electronic printing processes with gallium arsenide light emitting diode (LED) arrays which typically function at wavelengths of from 660 to about 830 nanometers.

In another embodiment, the present invention is directed to a process for the preparation of titanyl phthalocyanine which comprises 1) the use of a hollow glass tube which is placed in the reaction vessel such that the tip of said tube is completely submerged in the contents of the flask in order to effect the direct addition of anhydrous ammonia gas, available from Matheson Gas Products in an amount of from about 0.1 parts to about 2 parts and preferably about 1 part of the phthalonitrile that is used on a molar basis, into a solution containing 1 part ortho-phthalonitrile, available from BASF, in from about 15 parts to about 50 parts and preferably about 31 parts of a solvent such as N-methyl pyrrolidone, Quinoline, or chloronaphthalene, all available from Aldrich, at a temperature of from about −25° to about 50° C. and preferably about 25° C.; 2) stirring said mixture for a period of about 1 minute to about 2 hours and preferably about 1 hour and thus effecting the formation of 1,3-diiminoisoindoline in situ; 3) adding a titanium tetraalkoxide having, for example, an alkyl chain containing from 1 carbon atom to about 6 carbon atoms, available from Aldrich, to the aforementioned mixture; 4) relatively slow application of heat at a rate of about 1° C. per minute to about 10° per minute and preferably at about 5° per minute until refluxing occurs at a temperature of about 130° C. to about 180° C.; 5) removal and collection of the resulting distillate, which was shown by NMR spectroscopy to be the alcohol of the corresponding propoxide being used, in a dropwise fashion using an appropriate apparatus, such as a Claisen Head Condenser, until the temperature of the reactants reaches from 190° C. to about 200° C. and preferably about 200° C.; 6) continued stirring at the said reflux temperature for a period of about 1 hour to about 8 hours and preferably about 2 hours; 7) cooling by removal of the heat source of the reactants to a temperature of about 130° C. to about 180° C. and preferably about 160° C.; 6) filtration of the flask contents through, for example, an M-porosity (10 to 15 μm) sintered glass funnel which was preheated using a solvent which is capable of raising the temperature of the funnel to about 150°, such as boiling dimethylformamide in an amount sufficient to completely cover the bottom of the funnel to prevent blockage of the filter; 7) washing the resulting purple solid by slurrying said solid in portions of boiling DMF either in the funnel or in a separate vessel in a ratio of about 1 to about 10 and preferably about 3 times the volume of the solid being washed until the filtrate became light blue in color; 8) cooling the solid by slurrying said solid in one portion of DMF at room temperature, about 25° C., either in the funnel or in a separate vessel, approximately equivalent to three times the volume of the solid present; 9) washing the solid with one portion, approximately equivalent to three times the volume of the solid present, of another solvent such as an alcohol, like methanol, acetone, water and the like; and 10) oven drying in the presence of a vacuum or in air at a temperature of from 25° C. to about 200° C. and preferably about 70° C. for a period of from about 2 hours to about 48 hours and preferably about 24 hours thereby resulting in a shiny purple solid in a yield of about 50 percent to about 80 percent and in an embodiment of about 65 percent, which was identified as being Type I titanyl phthalocyanine by its X-ray powder diffraction trace. Elemental analysis of the Type I titanyl phthalocyanine indicated C, 66.04 percent, H, 2.81 percent, and N, 19.31 percent. Pure titanyl phthalocyanine I contains C, 66.67 percent, H, 2.80 percent, and N, 19.44 percent.

Examples of solvents which can be used to effect washing of the product titanyl phthalocyanine pigment include but are not limited to alcohols such as an alkylalcohol including methanol, ethanol, propanol, isopropanol, butanol, n-butanol, pentanol and the like; ethers such as diethyl ether and tetrahydrofuran; hydrocarbons such as pentane, hexane and the like with, for example, from about 4 to about 10 carbon atoms; aromatic solvents such as benzene, toluene, xylene, halobenzenes such as acetone, methyl ethyl ketone, and butyraldehyde; glycols such as ethylene and propylene glycol and glycerol; polar aprotic solvents such as dimethyl sulfoxide, dimethylformamide and N-methylpyrrolidone; and water, as well as mixtures of the aforementioned solvents.

The inventions will now be described in detail with reference to specific preferred embodiments thereof, it being understood that these examples are intended to be illustrative only. The invention is not intended to be limited to the materials, conditions, or process parameters recited herein, it being noted that all parts and percentages are by weight unless otherwise indicated.

EXAMPLE I

Synthesis of Type I Titanyl Phthalocyanine

To a 300 milliliter three-necked flask fitted with mechanical stirrer, condenser and thermometer maintained under an argon atmosphere was added 3.6 grams (0.025 mole) of 1,3-diiminoisoindoline, 9.6 grams (0.075 moles) of o-phthalonitrile, 75 milliliters (80 weight percent) of N-methyl pyrrolidone and 7.11 grams (0.025 mole) of titanium tetrapropoxide (all the aforementioned reagents were obtained from Aldrich Chemical Company except that phthalonitrile which was obtained from BASF). The resulting mixture (20 weight percent of solids) was stirred and warmed to reflux (about 198° C.) for 2 hours. The resultant block suspension was cooled to about 160° C. then was filtered by suction through a 350 milliliter, M-porosity sintered glass funnel which had been preheated with boiling, 150° C., dimethyl formamide (DMF). The solid TiOPc I product resulting was washed with two 150 milliliter portions of boiling DMF and the filtrate, initially black, became a light blue-green color. The solid was slurried in the funnel with 150 milliliters of boiling DMF and the suspension was filtered. The resulting solid was washed in the funnel with 150 milliliters of DMF at 25° C. then with 50 milliliters of methanol. The resultant shiny dark blue solid was dried at 70° C. overnight to yield 10.9 grams (76 percent) of pigment which was identified as Type I TiOPc on the basis of its X-ray powder diffraction trace. All X-ray powder diffraction traces were obtained using a Phillips Model 1710 X-ray Powder Diffractometer equipped with a graphite monochrometer and pulse height analyzer. X-radiation of the CuKα wavelength (λ=0.1542 nanometer) was used and all samples were finely ground with a mortar and pestle before loading into a standard powder diffraction holder. Elemental analysis of the product indicated C, 66.54; H, 2.60; N, 20.31; and Ash (TiO2), 13.76. TiOPc requires (Theory); C, 66.67; H, 2.80; N, 19.44; Ash, and 13.86.

This product had a crystal size or average diameter of about 50 microns as determined by SEM and a caliper with the crystal shape being tightly clustered aggregates of smaller crystallites. The washing and filtration steps were carried out rapidly with only about 5 minutes being required to effect each DMF wash.

Particle sizes of titanyl phthalocyanine products obtained with the processes of the present invention in embodiments thereof can be from about 30 to about 100 microns in length, and from about 10 to about 50 microns in width as measured by SEM or TEM and a caliper.

EXAMPLE II

The process of Example I was repeated with the exception that 150 milliliters, instead of 75 milliliters, of N-methyl pyrrolidone was selected. Filtration and subsequent washing of the aforementioned product required up to 12 hours to effect each washing with boiling DMF. Electron microscopy revealed that the product particles obtained were 50 microns in length, and 20 microns in width, and the crystals were single rather than strongly aggregated as were the crystals obtained in Example I. The product was identified as Type I titanyl phthalocyanine on the basis of its X-ray powder diffraction trace.

EXAMPLE III

The process of Example I was repeated three times except that the ratio of phthalonitrile to diiminoisoindoline was changed to 1:1, 6:1, and 10:1, respectively. The corresponding yields of Type I TiOPc, obtained after washing and drying the product, were 76 percent, 61 percent, and 56 percent, respectively.

EXAMPLE IV

Synthesis of Type I Titanyl Phthalocyanine: Ammonia Gas Method

A 250 milliliter three-necked flask fitted with mechanical stirrer, condenser, thermometer and ammonia gas bubbler was charged with o-phthalonitrile (12.8 grams, 0.1 mole), and 150 milliliters of N-methyl pyrrolidone. Ammonia gas (Matheson gas) was then bubbled through the solution for 15 minutes at which time titanium tetrapropoxide (7.11 grams, 0.025 mole) was added in one portion causing the solution to turn yellow in color. Heat was applied to the flask causing a series of color changes to occur; from yellow to orange to dark brown to dark green, the latter color change occurring when the contents of the flask neared 180° C. The solution was stirred at reflux (202° C.) for 90 minutes after the attainment of reflux. At this time, the contents were cooled to about 160° C. and then filtered by suction through a 350 milliliter M-porosity sintered glass funnel which had been preheated with boiling dimethyl formamide (DMF). Washing was completed as in Example I above. The purified solid was oven dried at 70° C. overnight to yield 9.3 grams (65 percent yield) of blue pigment which was identified as Type I TiOPc by XRPD.

The elemental analysis of the Type I product was: C, 66.04; H, 2.81; N, 19.31; and Ash, 16.27. TiOPc requires: C, 66.67; H, 2.80; N, 19.44; and Ash, 13.61.

EXAMPLE V

Preparation of Type X Titanyl Phthalocyanine

To a solution of trifluoroacetic acid (100 milliliters) in methylene chloride (400 milliliters) stirred with a magnet in a 1 liter Erlenmeyer flask was added 50 grams of Type I TiOPc, synthesized as in Example I, over a 2 minute period. No heat was evolved and the resultant dark green solution was stirred at room temperature for 15 minutes. The solution was poured over a 2 minute period into a solution of methanol (2.5 liters) and water (2.5 liters), contained in a 12 liter glass cylinder, which was stirred with a 100 millimeter long magnetic stir bar at a rate which was sufficient to create a vortex, which extended almost to the bottom of the flask. Following the addition, the resultant blue suspension was stirred at room temperature for 45 minutes, then was allowed to stand undisturbed for 25 minutes. The yellowish brown supernatant liquid was almost completely separated from the precipitated solid by carefully decanting the reaction vessel. The remaining blue residue was redispersed in 2 liters of methanol by stirring with a magnet for 1 hour at room temperature. The resultant suspension was filtered through an 18 centimeter glass fiber filter in a porcelain filter funnel and the filter cake was washed in succession with $2 \times 100$ milliliters of methanol, $2 \times 100$ milliliters of water, 500 milliliters of water, then $2 \times 100$ milliliters of methanol. The product was dried at 75° C. overnight to provide 47.6 grams (95 percent yield) of dark blue pigment which was identified as Type X TiOPc by XRPD.

EXAMPLE VI

Preparation of Type IV TiOPc

A 20 milliliters aliquot of a solution of 10 grams of Type I TiOPc, prepared in N-methylpyrrolidone solvent as in Example I, in 100 milliliters of a mixture of trifluoroacetic acid in methylene chloride (1:4, v/v) was added over a 2 minute period to a rapidly stirred solution of methanol (45 milliliters) and water (135 milliliters). The resultant coarse suspension was stirred at room temperature for 35 minutes then was allowed to settle. The supernatant liquid was decanted and the blue residue was redispersed in 100 milliliters of methanol by stirring for 15 minutes. The suspension was filtered using a 7 centimeter diameter glass fiber filter in a porcelain funnel. The solid was washed in the funnel with $2 \times 10$ milliliter portions of methanol, $4 \times 20$ milliliter portions of deionized water and $2 \times 10 \times 20$ milliliter portions of water and $2 \times 10$ milliliter portions of methanol. The solid was dried at 75° C. to yield 1.85 gram of blue pigment identified as Type IV TiOPc by XRPD.

The titanyl phthalocyanine Type IV or X was evaluated as a photogenerator in a xerographic imaging device which was prepared by the following procedure. An aluminized Mylar substrate was coated with a Nylon 8 solution prepared by dissolving 5 grams of Nylon 8 (Dainippon Ink and Chemical Company) in 24 grams of n-butanol and 4 grams of water using a 1 mil gap applicator. This layer was dried at 135° C. for 20 minutes; the final thickness was measured with a caliper to be 0.6 micron. A dispersion of the TiOPc Type IV or X was prepared by ball milling 0.35 gram of the TiOPc Type IV or X, respectively, and poly(vinyl butyral) in 13.4 grams of butyl acetate in a 30 milliliter jar containing 70 grams of ⅛ inch stainless steel balls. The dispersion was milled for 20 hours then was coated onto the Nylon 8 layer described above using a 1 mil applicator. The thus formed photogenerating layer was dried at 100° C. for 10 minutes; its final thickness was determined to be about 0.40 micron.

Charge transporting layers solution were prepared by dissolving 5.4 grams of N,N'-diphenyl-N,N-bis(3-methyl phenyl)-1,1'-biphenyl-4,4'-diamine, and 8.1 grams of polycarbonate in 52 grams of chlorobenzene. The solution was coated onto the TiOPc generator layer using an 8 mil film applicator. The charge transporting layer thus obtained was dried at 115° C. for 60 minutes to provide a final thickness of about 23 microns.

The xerographic electrical properties of a photoresponsive imaging member prepared as described above were determined by electrostatically charging the surface thereof with a corona discharge source until the surface potential, as measured by a capacitatively coupled probe attached to an electrometer, attained an initial dark value, $V_0$, of $-800$ volts. After resting for 0.5 second in the dark, the charged member reached a surface potential, $V_{ddp}$, or dark development potential. The member was then exposed to filtered light from a Xenon lamp. A reduction in surface potential from $V_{ddp}$ to a background potential, $V_{bg}$, due to the photodischarge effect, was observed. The dark decay in volts per second was calculated as $(V_0-V_{ddp})/0.5$. The percent of photodischarge was calculated as $100\times(V_{ddp}-V_{bg})/V_{ddp}$. The half-exposure energy, $E_{\frac{1}{2}}$, the required exposure energy causing reduction of the $V_{ddp}$ to half of its initial value, was determined. The wavelength of light selected for our measurements was 800 nanometers.

EXAMPLE VII

A xerographic device prepared and evaluated as described in Example VI, wherein the photogenerating pigment was the Type X TiOPc of Example V, had the following properties: $V_{ddp}$, 805 volts; dark decay, 27 volts/second; $E_{\frac{1}{2}}$, 1.3 erg/cm$^2$.

EXAMPLE VIII

A xerographic device, prepared and evaluated as described in Example VI except that the Type IV TiOPc of Example VI was selected as the photogenerating pigment, had the following properties: Vddp, 803 volts, dark decay, 56 volts/second; $E_{\frac{1}{2}}$, 1.5 ergs/cm$^2$.

Other modifications of the present invention may occur to those skilled in the art based upon a reading of the present disclosure and these modifications are intended to be included within the scope of the present invention.

What is claimed is:

1. A process for the preparation of titanyl phthalocyanine Type I consisting essentially of the addition to a solvent of N-methylpyrrolidone, chloronaphthalene, chlorobenzene, or quinoline of titanium tetraalkoxide to a mixture of phthalonitrile and a diiminoisoindoline, followed by heating, and wherein the alkoxide contains from 1 to about 6 carbon atoms.

2. A process in accordance with claim 1 wherein the diiminoisoindoline is 1,3-diiminoisoindoline.

3. A process in accordance with claim 1 wherein the titanium tetraalkoxide is titanium tetrapropoxide.

4. A process in accordance with claim 1 wherein the titanium tetraalkoxide is titanium tetrabutoxide.

5. A process in accordance with claim 1 wherein the phthalonitrile is ortho-phthalonitrile.

6. A process in accordance with claim 1 wherein the addition of the titanium tetraalkoxide is accomplished subsequent to dissolving the phthalonitrile and diiminoisoindoline in an organic solvent comprised of N-methylpyrrolidone, chloronaphthalene, chlorobenzene, or quinoline.

7. A process in accordance with claim 1 wherein the obtained titanyl phthalocyanine is purified by washing with boiling N,N-dimethylformamide followed by washing with a second solvent of methanol, acetone, or water.

8. A process in accordance with claim 1 wherein the phthalonitrile and diiminoisoindoline are present in a ratio of from about 10:1 to about 1:1, respectively, for each mole of titanium tetraalkoxide.

9. A process in accordance with claim 1 wherein the ratio of the phthalonitrile and the diiminoisoindolene, on a molar basis, is from about 1:1 to about 10:1, based on the titanium tetraalkoxide.

10. A process in accordance with claim 9 wherein relatively large rectangular aggregated titanyl phthalocyanine crystals of titanyl phthalocyanine pigment of a uniform size of about 50 microns in length and about 20 microns in width result.

11. A process in accordance with claim 1 wherein the amount of reaction components selected is from about 5 to about 40 percent by weight based on the amount of solvent.

12. A process for the preparation of titanyl phthalocyanine Type I consisting essentially of adding titanium tetraalkoxide which alkoxide contains from 1 to about 6 carbon atoms to a mixture of phthalonitrile and diiminoisoindolene in an organic solvent of N-methylpyrrolidone, chloronaphthalene, chlorobenzene, or quinoline; heating said mixture to reflux; removing any volatile byproducts by distillation thereby increasing the reflux temperature to about 180° to about 200° C.; maintaining the reaction mixture at said temperature for a time period of from about 0.5 to about 8 hours; followed by cooling the reaction mixture to a temperature of from about 130° to about 180° C.; and filtering said hot mixture to separate the solid titanyl phthalocyanine I product.

13. A process in accordance with claim 12 wherein the solid product is washed with boiling dimethylformamide solvent to remove impurities.

14. A process in accordance with claim 13 wherein following washing with boiling dimethylformamide the product is washed with methanol, water or acetone.

15. A process in accordance with claim 13 wherein the washed titanyl phthalocyanine pigment product is dried at ambient pressure or under a vacuum at a temperature of from about 50° to about 200° C. for a time of from about 0.5 to 48 hours.

16. A process in accordance with claim 1 wherein there is obtained a Type I crystal form of titanyl phthalocyanine.

17. A process in accordance with claim 1 wherein there is obtained titanyl phthalocyanine Type I having carbon, hydrogen and nitrogen analyses with 0.5 percent of the theoretical values for titanyl phthalocyanine of carbon, 66.67 percent, hydrogen, 2.80 percent, and nitrogen, 19.44 percent.

18. A process for the preparation of titanyl phthalocyanine Type I wherein anhydrous ammonia gas is introduced into a solution consisting essentially of phthalonitrile and an organic solvent comprised of N-methylpyrrolidone, chloronaphthalene, or quinoline, followed by the addition of a titanium tetraalkoxide andwherein the alkoxide contains from 1 to about 6 carbon atoms, and wherein there is formed in situ diiminoisoindolene.

19. A process in accordance with claim 18 wherein ortho-phthalonitrile and N-methyl pyrrolidone solvent are selected.

20. A process in accordance with claim 18 wherein the amount of ammonia introduced into the reaction mixture, on a molar basis, is from about 0.1 part to about 2 parts of the phthalonitrile present in the mixture.

21. A process in accordance with claim 18 wherein the ammonia gas is introduced into the reactant mixture at a temperature of from about a minus 25° to about 50° C.

22. A process in accordance with claim 18 wherein the ammonia is bubbled into the reaction mixture for a time of from 5 minutes to about 2 hours.

23. A process in accordance with claim 18 wherein following the introduction of ammonia gas into the reaction mixture the reaction is warmed to a temperature of from about 30° to about 100° C. while continuing to add ammonia.

24. A process in accordance with claim 18 in which the addition of ammonia is continued until the reaction mixture has reached a reflux temperature of from about 140° to about 200° C.

25. A process in accordance with claim 18 wherein the reaction mixture is maintained at a reflux temperature of from about 180° to about 200° C. for a period of from about 0.5 to about 8 hours after the introduction of ammonia has been terminated.

26. A process for the preparation of titanyl phthalocyanine Type I consisting essentially of introducing ammonia into a mixture of phthalonitrile and titanium tetraalkoxide in a N-methylpyrrolidone solvent wherein the alkoxide contains from 1 to about 6 carbon atoms, heating said mixture to reflux while maintaining the ammonia addition, retaining the mixture at a reflux temperature for a period of from about 0.5 to about 8 hours, cooling the mixture to about 130° to about 180° C., and filtering said mixture to separate the solid titanyl phthalocyanine Type I.

27. A process in accordance with claim 26 wherein the solid product is washed with boiling dimethylformamide solvent to remove surface impurities.

28. A process in accordance with claim 27 in which, following the washing of the solid with boiling dimethylformamide, the solid is subsequently washed with solvents at room temperature, which solvents are comprised of methanol, acetone and water.

29. A process in accordance with claim 28 wherein the washed pigment is dried at ambient pressure or under vacuum at a temperature of from about 50° to about 200° C. for a time of about ½ to about 48 hours.

30. A process in accordance with claim 18 wherein following the initial heating of the reaction mixture, titanium tetraalkoxide is added to the mixture 31. A process in accordance with claim 18 wherein the titanium tetraalkoxide is added in an amount of from about 0.1 part to about 1 part of the phthalonitrile that is present in the reaction mixture on a molar basis.

32. A process in accordance with claim 1 wherein the diiminoisoindoline is 1,3-diiminoisoindoline, and the phthalonitrile is ortho-phthalonitrile.

33. A process in accordance with claim 1 wherein the said titanyl phthalocyanine Type I has a particle size length of 30 to 100 microns and a particle size width of 10 to 50 microns.

* * * * *